(No Model.)  2 Sheets—Sheet 1.
R. B. ROBBINS.
CORN HARVESTING MACHINE.
No. 585,786.  Patented July 6, 1897.
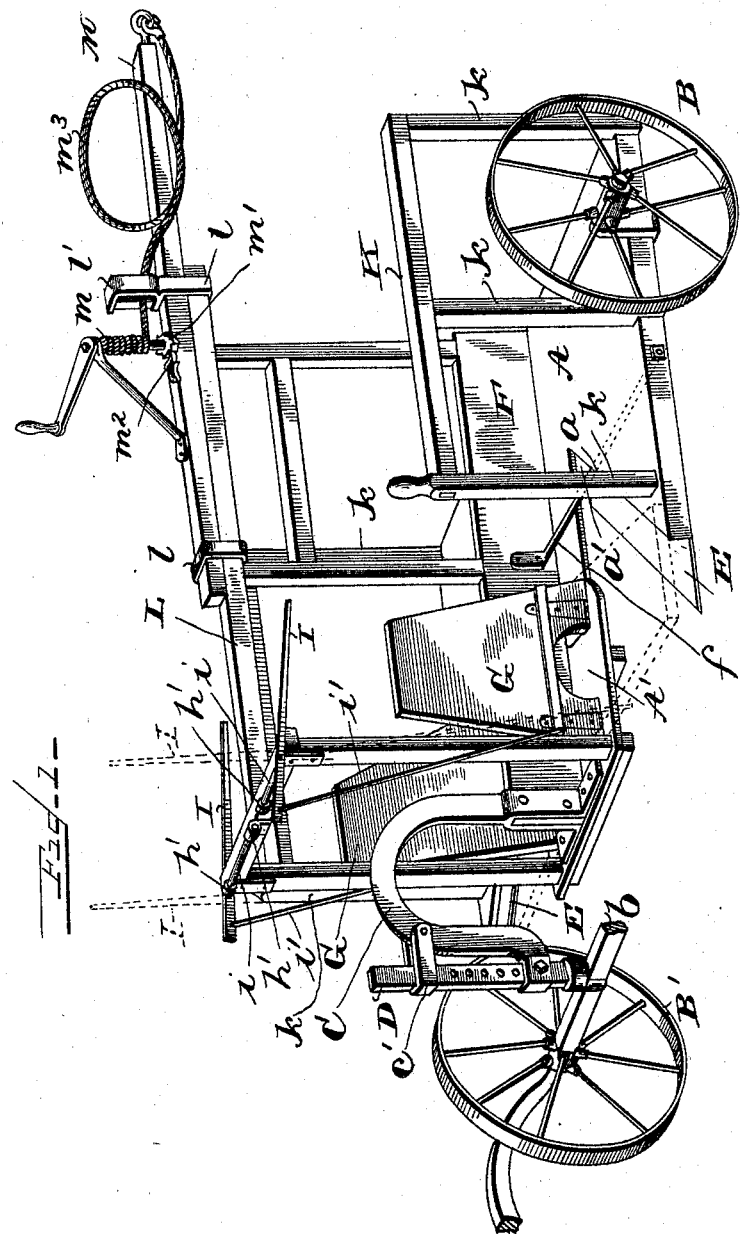
Witnesses
G. A. Tauberschmidt
J. D. Kingsbury
Inventor
Richard B. Robbins
By J. Whitaker Provost Attys

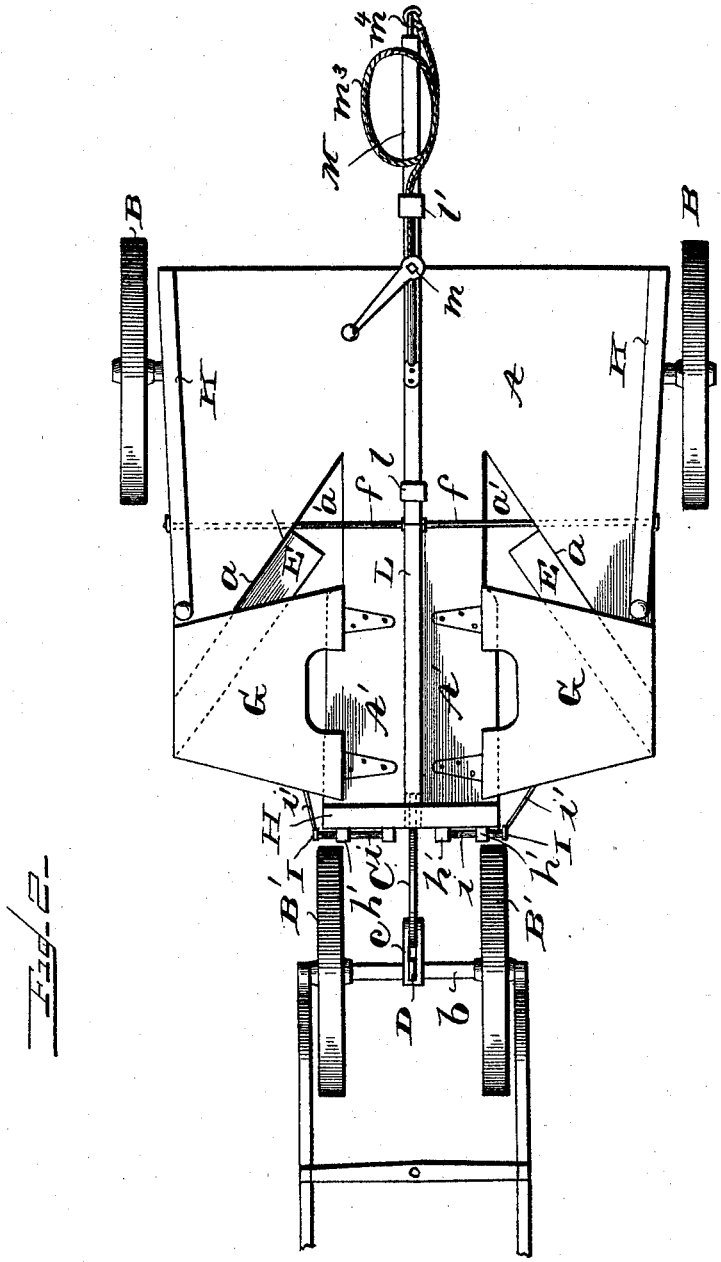

UNITED STATES PATENT OFFICE.

RICHARD B. ROBBINS, OF ADRIAN, MICHIGAN.

CORN-HARVESTING MACHINE.

SPECIFICATION forming part of Letters Patent No. 585,786, dated July 6, 1897.

Application filed April 16, 1896. Serial No. 587,851. (No model.)

*To all whom it may concern:*

Be it known that I, RICHARD B. ROBBINS, a citizen of the United States, residing at Adrian, in the county of Lenawee and State of Michigan, have invented certain new and useful Improvements in Corn-Harvesting Machines; and I do hereby declare the following to be a full, clear, and exact description of the invention, such as will enable others skilled in the art to which it appertains to make and use the same.

My invention is an improvement in corn-harvesters; and it consists in the novel features hereinafter described, reference being had to the accompanying drawings, which illustrate one form in which I have contemplated embodying my invention, and said invention is fully disclosed in the following description and claims.

Referring to the drawings, Figure 1 represents a perspective view of a corn-harvesting machine constructed according to and embodying my invention. Fig. 2 is a top plan view of the same.

In the drawings, A represents the main platform of my improved machine, which is preferably supported at the rear by the wheels B B and at its forward end by a swiveled truck.

In the drawings I have shown the forward end of the platform A provided with an arched bar C, secured to the platform at one end and having its forward end provided with a sliding collar or clip c, which embraces a vertical standard D, the lower end of which is pivotally secured to the front axle b of the truck which carries the wheels B' B'. The standard D is provided with a series of holes, and the clip or collar c is provided with an adjusting-bolt, which is passed through the collar and one of said holes, so that the front end of the platform A can be adjusted vertically in a very simple and efficient manner. I may, however, employ other well-known forms of adjusting devices to accomplish this result, if found desirable. In order to steady the vertical standard D, I also prefer to provide the arched bar C with an auxiliary clip c', secured to said arched bar at a point adjacent to the top of the same and adapted to have a sliding movement with the said standard.

It will be seen that by means of the arched-bar construction just described the machine can be very readily turned in a field, as the front wheels of the pivoted truck will pass under the arched bar when the machine is turned around.

In the drawings I have shown the machine arranged to cut two rows of corn simultaneously, and to this end the platform A is provided at each side with a recessed or cut-away portion having an inclined edge a, to which is secured rigidly the inclined knife E or cutter. This knife does not extend to the extreme inner point of the recess in the platform, and thus leaves an open space (indicated at a') in the rear of each knife E to allow weeds and the like to escape from the machine, thus avoiding clogging.

F represents a central dividing-board which is secured to the platform A and extends longitudinally thereof along its central portion. In order to securely brace the outer portions of the platform A against the outward strain exerted upon the knives when they are brought into engagement with the cornstalks, I provide the braces f, which extend from the central portion of the platform A, they being secured in this instance to the said dividing-board F across the open space a' and to the outer edge of the platform A, as shown in the drawings. The portions of these braces f which extend across the open spaces a' also tend to rid the machine of weeds and fine stuff which will not be cut by the knives, and thus prevent clogging.

The portions of the platform A on each side of the dividing-board F and between it and the recessed portions of the platform, which are indicated by the letters A' A', form platforms or supports upon which the operators stand during the operation of the machine. To each of these stationary supporting portions A' A' is secured a hinged guard-platform G, adapted when in a horizontal position to lie over the forward portion of the knife E, so as to protect it from injury and to protect the operators and horses from being injured by it, and when in a vertical position to shield the operator from the butts of the cornstalks.

At the front part of the central portion of the platform A are the vertical standards h h, connected at their upper ends by a cross-bar H. To this cross-bar are pivoted two lever-guards I, one at each end of said cross-bar, said lever-guards being substantially in line with the guard-platforms G when the latter are in vertical position. In this instance I have shown each of said lever-guards I provided with an elongated pivot $i$, mounted in suitable bearings $h'$ on the cross-bar H, in order to give said lever-guards a substantial pivotal support. The said lever-guards are provided each with a short arm extending forwardly from the pivot-arm, said short arm being connected by a link or rod $i'$ with the platform G immediately below it, the connection being such that when the lever-guards are in a horizontal position, as shown in Fig. 1, the platform guards G are in a vertical position, and vice versa. The lever-guards extend rearwardly between the operators standing upon the stationary supporting portions A' of the platform and the corn and are also used by the operators in raising and lowering the platform guards G G.

Each side of the platform A is provided with a guard-rail K, supported by suitable standards $k$, to prevent the stalks laid upon the platform from falling over the sides, and a central rail L is also supported by suitable standards extending upwardly from the dividing-board F. Upon the central rail L is mounted what I term the "sliding horse," which consists in this instance of a horizontal bar M, engaging straps $l\ l$, secured to the rail L, so that the bar M can slide longitudinally thereof. Upon the horse or bar M is mounted a small windlass $m$, provided, preferably, with a ratchet $m'$ and pawl $m^2$, the windlass being also provided with a compressing-rope $m^3$, which passes through a guide $l'$ on the outer strap $l$ and is provided with a snap-hook or other suitable securing device at its outer end, adapted to engage a perforated ear or eyebolt $m^4$, secured to the outer end of the bar M.

The operation of the device is as follows: The machine is driven across the field with each of the knives E in line with a row of cornstalks, the machine being arranged as shown in Fig. 1, the guard-platforms G being raised and guard-levers I being in a horizontal position to protect the operators from the cornstalks. As the knives E are forced against the stalks they will sever the latter, the operator seizing the severed stalks and depositing them upon the rear portions of the platform A until a sufficient quantity has accumulated to form a shock. The machine is then stopped. The guard-levers I are raised by the operators, thus lowering the guard-platforms G so as to cover the knives E and enable the operators to step over them in safety. The stalks are then arranged in a shock on each side of a bar M or horse, and the rope $m^3$ is passed around the shock and the end hooked in the eyebolt $m^4$, after which the windlass is operated to compress the shock. The permanent band is then placed around the shock and secured, the rope $m^3$ is removed, the guard-levers and guard-platforms are restored to their normal position, as shown in Fig. 1, and the machine is again started, thereby withdrawing the horse from the completed shock.

What I claim, and desire to secure by Letters Patent, is—

1. In a corn-harvester the combination with a platform provided with a stationary knife and a stationary support for an operator adjacent thereto, of a hinged guard-platform adjacent to said stationary support lying over said knife when in a horizontal position and standing between the operator and the knife when in a vertical position, substantially as described.

2. In a corn-harvester the combination with a platform provided at each side with a stationary knife, and a central support for an operator located between said knives, of a guard-platform hinged to said central support at each side of the same, lying over said knives when in horizontal position and standing between the operator upon said central support and said knives on both sides of the central support when in vertical position, substantially as described.

3. In a corn-harvester the combination with a platform provided with a stationary knife, and a support for an operator adjacent to said knife, of a platform hinged to said support, lying over said knife when in horizontal position and standing between said knife and the operator when in vertical position, a horizontal guard-lever pivotally mounted above said hinged platform and occupying substantially the same vertical plane when the platform is in vertical position, said guard-lever when in horizontal position lying between the operator and the standing corn engaged by the knife, and operative connections between said guard-lever and hinged platform for securing their simultaneous movement, substantially as described.

4. In a corn-harvester the combination with the main platform provided with the stationary knives at opposite sides of the same and stationary supports for operators intermediate said knives, of pivoted guard-platforms pivoted to said supports and adapted to lie over said knives when in horizontal position, the pivotally-mounted guard-levers above said guard-platform and substantially in the vertical planes of their pivotal connections with the stationary supports and the links connecting one end of each of said levers with its adjacent platform, substantially as described.

In testimony whereof I affix my signature in presence of two witnesses.

RICHARD B. ROBBINS.

Witnesses:
DORA D. RENIFF,
E. L. MILLS.